United States Patent
Benco et al.

(10) Patent No.: US 8,289,921 B2
(45) Date of Patent: Oct. 16, 2012

(54) METHOD AND SYSTEM FOR INTELLIGENT NETWORKING TRIGGER CONTENTION RESOLUTION IN IP MULTIMEDIA SUBSYSTEM NETWORKS

(75) Inventors: David S. Benco, Winfield, IL (US); Mark A. Ristich, Naperville, IL (US)

(73) Assignee: Alcatel Lucent, Paris (FR)

( * ) Notice: Subject to any disclaimer, the term of this patent is extended or adjusted under 35 U.S.C. 154(b) by 1090 days.

(21) Appl. No.: 12/082,304

(22) Filed: Apr. 10, 2008

(65) Prior Publication Data
US 2009/0257363 A1 Oct. 15, 2009

(51) Int. Cl.
*H04W 4/00* (2009.01)
*H04W 36/00* (2009.01)
(52) U.S. Cl. ...... 370/331; 370/329; 455/436; 455/422.1
(58) Field of Classification Search .................. 370/331
See application file for complete search history.

(56) References Cited

U.S. PATENT DOCUMENTS

| | | | |
|---|---|---|---|
| 2004/0203849 A1* | 10/2004 | Allison et al. | 455/456.1 |
| 2006/0258394 A1* | 11/2006 | Dhillon et al. | 455/552.1 |
| 2009/0080382 A1* | 3/2009 | Chen et al. | 370/331 |

* cited by examiner

*Primary Examiner* — Derrick Ferris
*Assistant Examiner* — Shripal Khajuria
(74) *Attorney, Agent, or Firm* — Carmen Patti Law Group, LLC

(57) ABSTRACT

A method of receiving a first InitialIN message, determining if the first InitialIN message is a mobile origination, determining if an mscAddress comprising the first InitialIN message is an IP Multimedia Subsystem (IMS) MSC address, and establishing DMS IN services with an SCF/SCP and performing VCC anchoring for a DMS communication session with a VCC SCF/SCP if the InitialIN is a mobile origination and if the mscAddress is an IMS MSC address.

21 Claims, 4 Drawing Sheets

METHOD AND SYSTEM FOR INTELLIGENT NETWORKING TRIGGER CONTENTION RESOLUTION IN IP MULTIMEDIA SUBSYSTEM NETWORKS

TECHNICAL FIELD

The present invention is directed to a method and system for trigger contention resolution with IP multimedia subsystem networks.

BACKGROUND

In recent years subscribers have been using cell phones in more technologically diverse environments. Subscribers use mobile phones in circuit switched environments, packet switched environments, Wi-Fi environments as well as other environments. Dual mode service (DMS), that is, use of a phone in a Wi-Fi environment as well as other cellular environments, has become more popular. Wi-Fi access points are plentiful in industry (e.g., coffee shops, airports, hotels) as well as at home. With the advent of Internet Protocol (IP) Multimedia Subsystem (IMS) networks, dual mode subscribers may use their mobile phones in both Wi-Fi and cellular networks. DMS calls across IMS networks and cellular networks have to be anchored in an IMS network. This anchoring requires adding a new service control point (SCP) or service control function (SCF) element to the IMS network (as per VCC). The additional SCF/SCP used to support DMS, however, is not integrated on the same platform as existing Intelligent Networking (IN) services. Offering IN services across separate SCF/SCPs may lead to trigger contention.

A need exists, therefore, for a way to address trigger contention issues that arise when a DMS subscriber wants to access their existing IN services across cellular and IMS networks.

SUMMARY

A method in one application of receiving a first intelligent networking (InitialIN) message, determining if the first InitialIN message is a mobile origination, determining if an mscAddress comprising the first InitialIN message is an IP Multimedia Subsystem (IMS) mobile switching center (MSC) address (mscAddress), and establishing DMS IN services with an SCF/SCP and performing VCC anchoring for a DMS communication session with a VCC SCF/SCP if the InitialIN is a mobile origination and if the mscAddress is an IMS MSC address.

A system in another application comprising a service switching function SSF)/service switching point (SSP), an SCF/SCP, a VCC SCF/SCP, a DMS IN Service Provider wherein the DMS IN Service Provider is communicatively coupled to the SSF/SSP, SCF/SCP and VCC SCF/SCP. Furthermore, the DMS IN Service Provider is configured to establish IN services for a dual mode call via the SSF/SSP and SCF/SCP, and the DMS IN Service Provider is configured to perform VCC anchoring in an IMS network via the VCC SCF/SCP.

DESCRIPTION OF THE DRAWINGS

Features of example implementations of the invention will become apparent from the description, the claims and the accompanying drawings in which:

DETAILED DESCRIPTION

The IMS network defines an architecture meant to provide a means for carriers to create an open, standards-based network that delivers integrated multimedia services to subscribers. An IMS subscriber may be a dual mode subscriber (DMS), that is, a subscriber that may access the IMS network via a cellular interface or a Wi-Fi interface. Dual mode subscribers may desire their existing IN services regardless of whether they are located in a cellular network or a Wi-Fi network.

Calls or communication sessions from a dual mode subscriber must be anchored in an IMS network. A call or communication session may be a circuit switched call, a data call, a packet call, or any other means of establishing communication between two mobile devices or a mobile device and a landline device. Anchoring a call in an IMS network requires that call processing involve a VCC SCF/SCP. Because there can only be one SCF/SCP address per trigger, trigger contention arises. The triggered SCF/SCP address is the VCC SCF/SCP address. Thus a dual mode subscriber's IN services must be negotiated with the VCC SCF/SCP regardless if the subscriber's services reside on another SCF/SCP.

Figure 1:
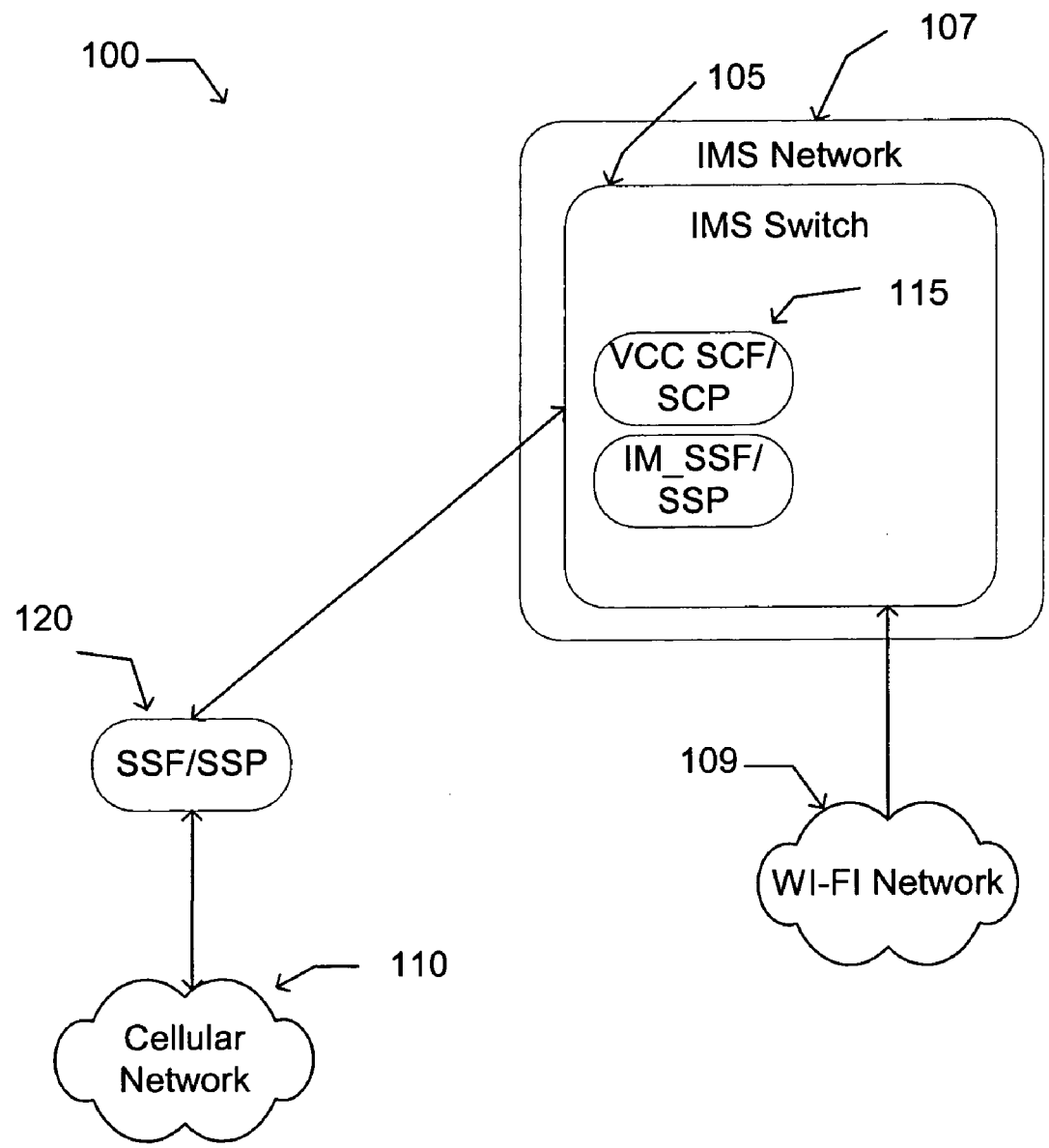
FIG. 1 is a system diagram used to provide a simple illustration of voice call continuity (VCC) anchoring.

Turning to FIG. 1, which is a simplified network diagram 100 that may be used for the purpose of illustrating VCC anchoring. In looking at components of the network 100, an IMS switch 105 may reside in an IMS network 107. The IMS network 107 may be in communication with a Wi-Fi network 109. The cellular network 110 may be a GSM network, an analog network, a CDMA network or any other type of circuit or packet switched cellular network. The service switching function (SSF)/service switching point (SSP) 120 may be a node in the network 100 that provides call processing functionality as well as access to a service control point (SCP). The VCC SCF/SCP 115 operates as an SCP in the network 100. An SCP may contain service logic and data that informs an SSF/SSP how to treat a call.

As mentioned, dual mode subscribers who have IMS service may need to have their calls anchored in the IMS network 107. If the IMS subscriber is not in the IMS network 107, for example, the subscriber may be in a GSM or other cellular network 110, when the IMS subscriber originates a call, the call must be anchored in the IMS network 107. In the process of anchoring a call, the SSF/SSP 120 may send an InitialIN message (for example, a CAMEL Application Part InitialDP message) to the VCC SCF/SCP 115. The VCC SCF/SCP 115 may send a temporary number routing number back to the SSF/SSP 120. The SSF/SSP 120 may use the temporary routing number to route the call into the IMS network 105. In this context, the essence of VCC anchoring comprises the VCC SCF/SCP 115 providing the SSF/SSP 120 a temporary routing number and routing the call to an IMS network using the temporary routing number.

Figure 2:
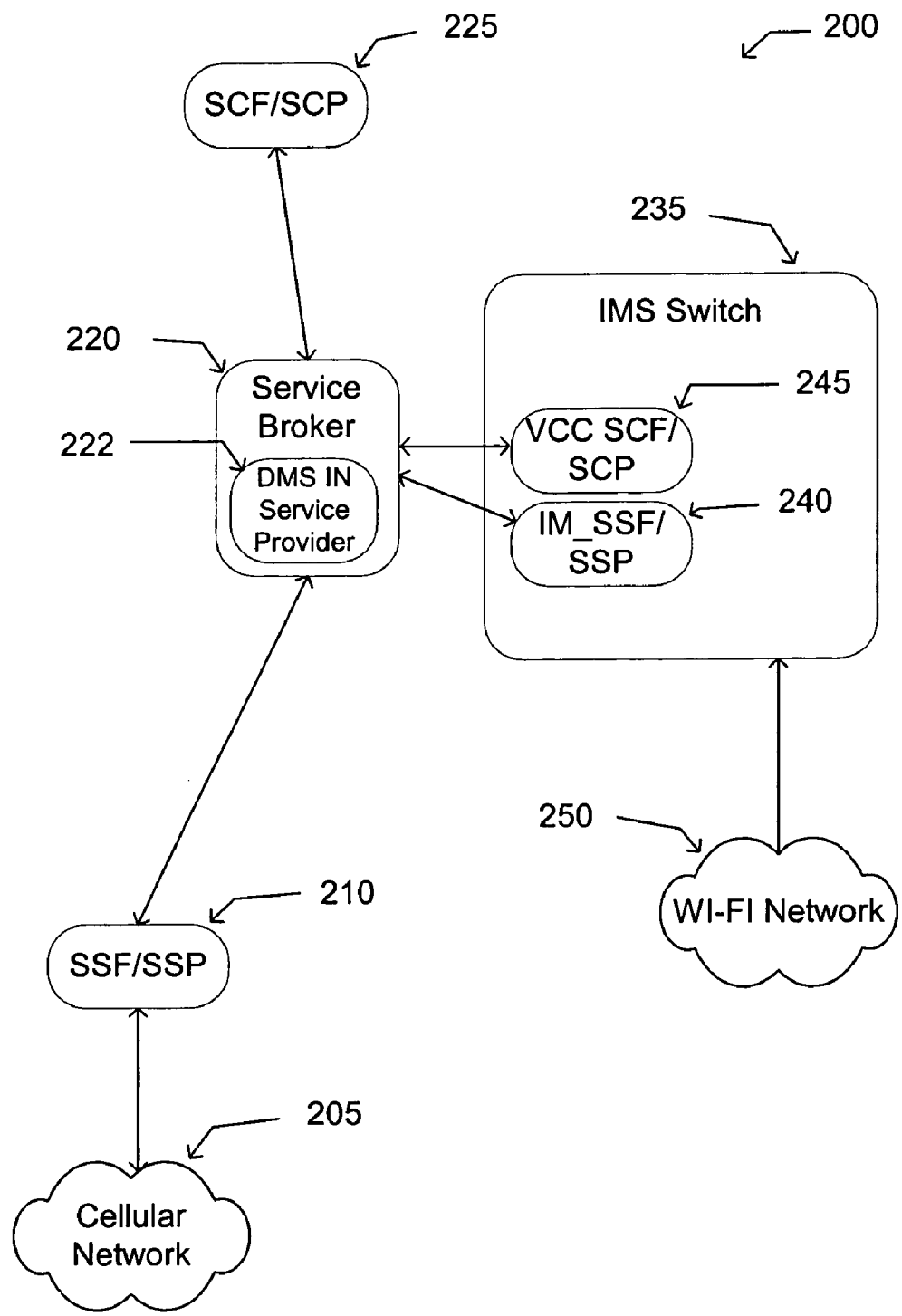
FIG. 2 is a system diagram of a network in which the system for intelligent networking trigger contention resolution in IP multimedia subsystem networks may reside.

Turing now to FIG. 2, a system 200 diagram of an example network in which the system for intelligent networking trigger contention resolution in IP multimedia subsystem networks may reside. The system 200 may provide a dual mode subscriber with IN services regardless of whether the subscriber is operating in a cellular network or a Wi-Fi network.

A dual mode subscriber may access the IMS network form a cellular network 205. The cellular network 205 may be communicatively coupled to a service switching function (SSF) or service switching point (SSP) 210. The SSF/SSP 210 may be communicatively coupled with a DMS IN Service Provider 222 that resides on a service broker 220. The DMS IN Service Provider 222 may communicate with other nodes in the network 200 via the service broker 220. The application protocol linking the SSF/SSP 210 and the DMS IN Service Provider 222 may be a Customized Applications for Mobile network Enhanced Logic (CAMEL) application part (CAP), an Advanced Intelligent Networking (AIN) protocol, a wireless intelligent networks (WIN) protocol, or an Intelligent Networking Application Part (INAP) protocol. Typically the SSF/SSP 210 queries a service control point (SCP). An SCP may contain service logic and data that informs an SSF/SSP 210 how to treat a call. In the system 200, however, the SSF/SSP 210 may communicate with a DMS IN Service Provider 222 instead of an SCP to get service logic and data that may inform the SSF/SSP 210 how to treat a call.

The DMS IN Service Provider 222 may be communicatively coupled to an SCF/SCP 225. The SCF/SCP 225, among other responsibilities, may manage service control. The SCF/SCP 225 may communicate with the DMS IN Service Provider 222 using a CAP, AIN, WIN, or INAP communication protocol. The DMS IN Service Provider 222 may also be communicatively coupled to an IM_SSF/SSP 240 and a VCC SCF/SCP 245 that may reside on an IMS switch 235. The IMS switch 235 may reside in an IMS network. The VCC SCF/SCP 245 may communicate with the DMS IN Service Provider 222 using a CAP, AIN, WIN, or INAP communication protocol. The IMS switch 235 may also be communicatively coupled to a Wi-Fi network 250. A DMS subscriber may originate or terminate calls from the Wi-Fi network 250.

The SSF/SSP 210, service broker 220, DMS IN Service Provider 222, and SCF/SCP 225 components are shown as separate entities. The components 210, 220, 222, 225, however, may reside on a single network node, or the components 210, 220, 222, 225 may reside in separate network nodes, or the components 210, 220, 222, 225 may reside in any combination in the same or different network nodes.

Although the DMS IN Service Provider 222 is depicted in the Service Broker 220, the DMS IN Service Provider 222 may reside in other nodes in a network. Furthermore, functionality ascribed to the DMS IN Service Provider 222 may be performed by another node in a network, or the DMS IN Service Provider 222 functionality may be distributed throughout a network.

The system 200 in one example comprises a plurality of components such as one or more of computer software components. A number of such components can be combined or divided in the system 200. An example component of the system 200 employs and/or comprises a set and/or series of computer instructions written in or implemented with any or a number of programming languages, as will be appreciated by those skilled in the art. The system 200 in one example comprises a vertical orientation, with the description and figures herein illustrating one example orientation of the system 200, for explanatory purposes.

The system 200 in one example employs one or more computer-readable signal-bearing media. The computer-readable signal-bearing media store software, firmware and/or assembly language for performing one or more portions of one or more implementations of the invention. The computer-readable signal-bearing medium for the system 200 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

Figure 3:
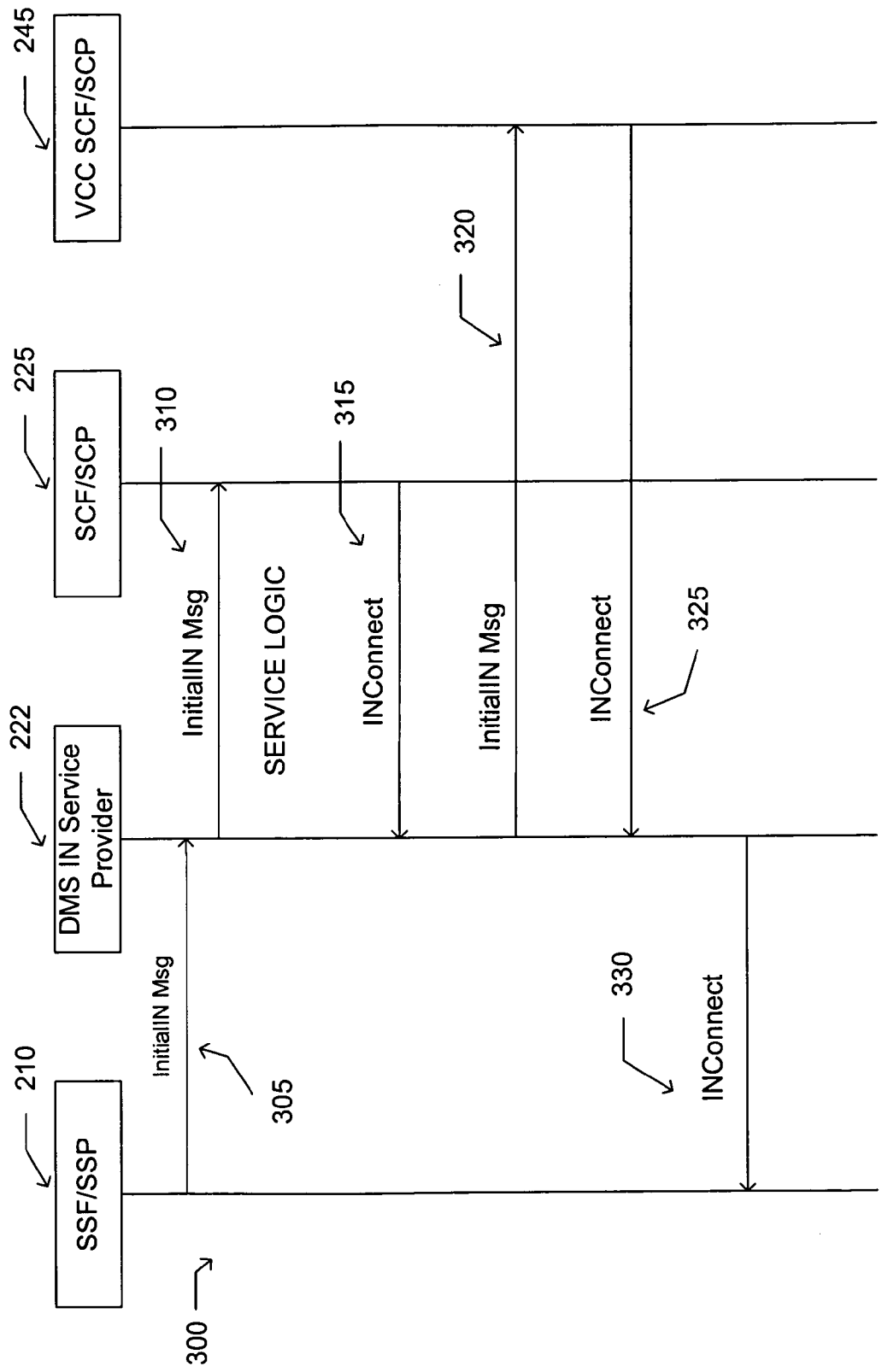
FIG. 3 is a sample call flow of messages that may be sent in support of the system and method.

Turning to FIG. 3, which depicts a sample call flow 300 that may be associated with establishing services for a DMS subscriber when the DMS subscriber originates a call in a cellular network. When a DMS subscriber originates a call/communication session in a cellular network the call may come into an SSF/SSP such as the SSF/SSP 210 of FIG. 2. As part of registration, Homer Location Register (HLR) data may be stored in a Visitor Location Register (VLR). The HLR data stored in the VLR may include the address of an SCP that provides service control for the call. The SSF/SSP 210 may query the VLR to determine the SCP address that provides service control for the call. In this example, the HLR may be configured such that the DMS IN Service Provider 222 is the entity that is supposed to provide IN services to support the call.

The SSF/SSP 210 may begin establishing services for the incoming call by sending a first InitialIN message 305 to the DMS IN Service Provider 222. If the protocol supported by the system 200 is CAP or INAP then the first InitialIN message 305 may be an InitialDP. For an AIN protocol the first InitialIN 305 message may be an Info_Analyzed, Info_Collected or Termination_Attempt message. In the case of a WIN protocol the first InitialIN message 305 may be an OriginationRequest.Invoke or AnalyzedInfo.Invoke. Regardless of the protocol used, an InitialIN message may comprise at least an mscAddress and an eventTypeBCSM or some equivalent to each of these two fields. The mscAddress is the address assigned the GMSC/MSC. For mobile originations, the mscAddress carries the international E.164address of the serving VMSC. For mobile terminations, the mscAddress carries the international E.164 address of the GMSC. For mobile terminations in a VMSC (VT calls), the mscAddress carries the international E.164 address of the serving VMSC. The event type that is a basic call state model (eventTypeBCSM) may indicate the armed BCSM DP event resulting in the InitialIN message operation.

The DMS IN Service Provider 222 may be configured with a table of MSC adresses that are addresses of MSCs that comprise an IMS network. The DMS IN Service Provider 222 may compare the mscAddress received in the first InitialIN mesage 205 with the table of IMS MSC addresses to determine if the mscAddress may be an address of an MSC that resides in the IMS network. If the mscAddress is an IMS MSC and the eventTypeBCSM indicates that this is a mobile origination, the DMS IN Service Provider 222 may store the contents of the first InitialIN message 305 received from the SSF/SSP 210 and send a second InitialIN message 310 to the SCF/SCP 225. As described above, depending on the IN protocol (AIN, INAP, WIN, CAP) used in the system 200, the second InitialIN message may be an InitialDP, Info_Analyzed, Info_Collected or OriginationRequest.Invoke. The DMS IN Service Provider 222 may use the first InitialIN message 305 received to populate the second InitialIN message 310, or the DMS IN Service Provider 222 may forward the first InitialIN message 305 to the SCF/SCP 225. Regardless, the service broker may store the contents of the first InitalINMsg 305 for later reference. Based on the data received in the first InitialIN messsage, the DMS IN Service Provider 222 may query a home subscriber server (HSS) or any database used by the system to store data based on a service key to determine which SCF/SCP 225 to send the second InitialIN message 310.

The SCF/SCP 225 may engage in service logic processing. Depending on the service invoked, different event detection points may be set. The SCF/SCP 225 may send a first INConnect message 315 to the DMS IN Service Provider 222. The first INConnect message 315 may be a CAP Connect, an INAP Connect, a WIN OriginationRequestReturnResult, a WIN AnalyzedInformationReturnResult, an AIN Analyze_Route, or an AIN Forward_Call message. The first INConnect message 315 may contain a new b-party number or connected number, that is a new destination phone number. The DMS IN Service Provider 222 may store the b-party number for later reference. The DMS IN Service Provider 222 may construct a third InitialIN message 320. The third InitialIN message 320 may be constructed with the parameters received in the first InitialIN message 305 and previously stored by the DMS IN Service Provider 222. The one field that may differ from the first InitialIN message 305 is the b-party number of the third InitialIN message 320. The third InitialIN message 320 may contain the connected number passed to the DMS IN Service Provider 222 in the first INConnect message 315. If the first INConnect message 315 that did not contain a connected number, such as a Continue message in the case of CAP, the third InitialIN message 320 may contain the b-party number received in the first InitialIN message 305 and previously stored by the DMS IN Service Provider 222. The third InitialIN message 320 is sent to the VCC SCF/SSP 245.

The VCC SCF/SCP 245 may respond to the third InitialIN message 320 with a second INConnect message 325. The second INConnect message 325 may contain a temporary routing number, such as, for example, a IMS Routing Number (IMRN). Thus the VCC SCF/SCP 245 is in the process of anchoring the call in IMS. The DMS IN Service Provider 222 may construct a third INConnect Message 330 using the parameters received in the first INConnect message 315 from the SCF/SCP 225. The IMRN received from the VCC SCF/SCP 24, however, may be passed back in the third INConnect message 330 in lieu of any connected number received in the first INConnect message 315. The SSF/SSP 210 may use the IMRN to route the call to the IMS network.

The SSF/SSP 210 may send event detection point (EDP) related messaging to the DMS IN Service Provider 222. The DMS IN Service Provider 222 may forward these messages to the SCF/SCP 225 as if the SSF/SSP 210 is communicating directly with the SCF/SSP 225. The SSF/SSP 210 and the SCF/SCP 225 may continue further communication with each other via the DMS IN Service Provider 222 in this manner. These communications may also include communications related to handovers. In these further communications, the DMS IN Service Provider 222 may pass through messages between the SSF/SSP 210 and the SCF/SCP 225 without performing any operations on the messages beyond routing the messages.

In the example call flow above, the mscAddress received in the first InitialIN message was not an IMS MSC address and the eventTypeBCSM received in the first InitialIN message indicated that the call was a mobile origination. If, however, the MSC address is an IMS MSC address, regardless of whether the eventTypeBCSM indicates that this is a mobile origination or mobile termination, VCC anchoring is not applicable. The DMS IN Service Provider 222 simply passes IN messages through to the intended recipient.

If the mscAddress received in the first InitialIN message is not an IMS address and the eventTypeBCSM received in the first InitialIN message indicates that the call is a mobile termination, only VCC anchoring is invoked. No other IN services are invoked. In this case, any other IN messages are passed through the DMS IN Service Provider 222 to the message destination. In all cases above, any messaging related to handovers may be handled in the same manner as any other call in this state.

Figure 4:
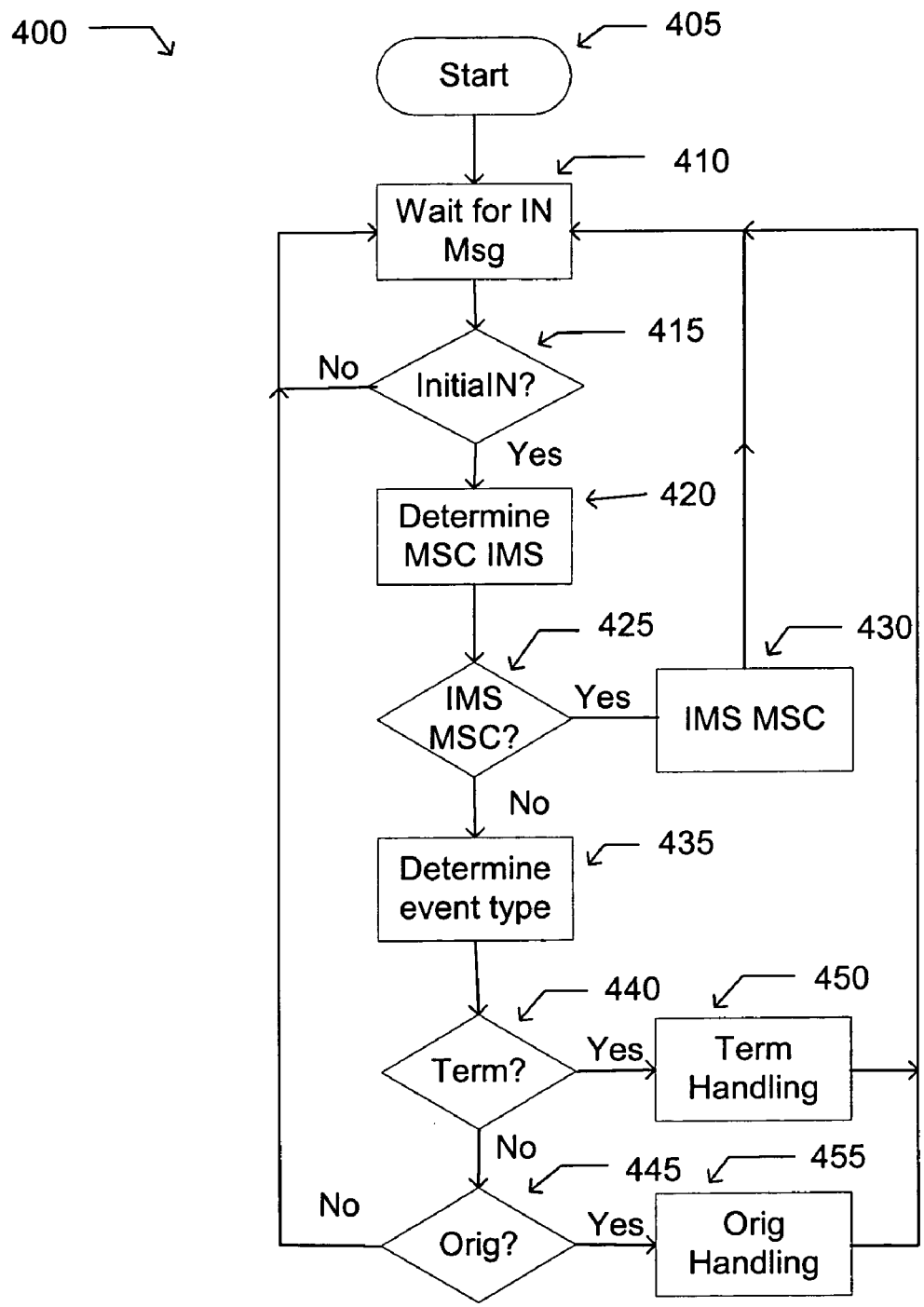
FIG. 4 is a representation of one implementation of a method for intelligent networking trigger contention resolution in IP multimedia subsystem networks.

Turning now to FIG. 4, which is an illustration of a method 400 for intelligent networking trigger contention resolution in IP multimedia subsystem networks. The method 400 in this example may reside in the DMS IN Service Provider 222 resident on the Service Broker 220. The method 400 in other implementations, however, may reside in other nodes in a network.

The method 400 begins in a start state 405 ready to receive IN messages 410. The method 400 determines if an incoming IN message is an InitialIN message 415. As previously described, depending on the network protocol supported, the InitialIN message may be one of many different types. For example, if the method 400 reside in a CAP or INAP network the initial IN message may be an InitialDP. In an AIN protocol network the InitialIN message may be an Info_Analyzed or Info_Collected message. In the case of a WIN protocol network the InitialIN message may be an OriginationRequest-.Invoke. As before, each of these messages may comprise at least an mscAddress and an eventTypeBCSM or some equivalent of these two fields. If the message is not an InitialIN message, the method 400 continues waiting for IN messages 410.

If the incoming message is an InitialIN message, the method 400 determines if the mscAddress is in the table of MSC addresses that are IMS MSC addresses 420. If the mscAddress is in the table 425, the method 400 performs IMS MSC handling 430. When the method 400 is performing IMS MSC handling 430, the method 400 simply passes messages between senders and receivers while a call is established. VCC anchoring is not applicable, and thus not performed. Once the call completes, the method 400 continues waiting for IN messages 410.

If the mscAddress is not in the table of MSC addresses that are IMS MSC addresses 425, the method 400 determines the eventTypeBCSM 435 passed in the InitialIN message. If the eventTypeBCSM indicates that the call is not a mobile termination 440 (eventTypeBCSM is not DP12), the method 400 checks to see if the call is a mobile origination 445. If the eventTypeBCSM indicates the call is not a mobile origination 445 (the eventTypeBCSM is not DP2), the method 400 continues waiting for IN messages 410.

If the eventTypeBCSM indicates that the call is a mobile termination 440, the method 400 enters termination handling 450. In termination handling the DMS IN Service Provider 222 performs VCC anchoring, but the DMS IN Service Provider 222 does not perform any other IN services. Instead, IN services may be performed from the IMS network after anchoring. The method 400 may then continue waiting for IN messages 410.

If the eventTypeBCSM indicates the call is a mobile origination 445, the method 400 may proceed to origination handling 445. In origination handling 445 the method 400 may handle messages as shown for the DMS IN Service Provider 222 in FIG. 3. The method 400, therefore, may handle an InitialIN message from the SSF/SSP 210 and send an InitialIN message to the SCF/SCP 220. Message handling may proceed as described in FIG. 3. The method 400 may then continue to wait for IN messages 410.

The steps or operations described herein are just for example. There may be many variations to these steps or operations without departing from the spirit of the system and method. For instance, the steps may be performed in a differing order, or steps may be added, deleted, or modified.

Although example implementations of the system and method have been depicted and described in detail herein, it will be apparent to those skilled in the relevant art that various modifications, additions, substitutions, and the like can be made without departing from the spirit of the method and these are therefore considered to be within the scope of the system and method as defined in the following claims.

We claim:

1. A method comprising the steps of:
   receiving a first intelligent networking (InitialIN) message;
   determining if the first InitialIN message is a mobile origination;
   determining if a mobile switching center (MSC) address (mscAddress) comprising the first InitialIN message is an IP Multimedia Subsystem (IMS) MSC address; and
   establishing dual mode service (DMS) intelligent networking (IN) services with a service control function (SCF)/service control point (SCP) and performing VCC anchoring for a DMS communication session with a voice call continuity (VCC) SCF/SCP if the InitialIN is a mobile origination and if the mscAddress is not an IMS MSC address.

2. The method of claim 1 wherein the step of receiving an InitialIN message further comprises performing at least one of a:
   CAMEL signaling protocol;
   Advanced Intelligent Networking signaling protocol;
   Wireless Intelligent Networking signaling protocol; and
   Intelligent Networking Application Protocol.

3. The method of claim 1 wherein the InitialIN message contains the mscAddress and an event type that is a basic call state model (eventTypeBCSM).

4. The method of claim 1 wherein the InitialIN message is at least one of a:
   CAMEL Application Part InitialDP message;
   Advanced Intelligent Networking Info_Analyzed message;
   Advanced Intelligent Networking Info_Collected message;
   Advanced Intelligent Networking Termination_Attempt message;
   Wireless Intelligent Networking Origination.Request.Invoke message;
   Wireless Intelligent Networking AnalyzedInfo.Invoke; and
   Intelligent Networking Application Part InitialDP message.

5. The method of claim 1 wherein determining if the InitialIN message is a mobile origination further comprises determining a type of event that is a basic call state model (eventTypeBCSM).

6. The method of claim 1 wherein determining if an mscAddress is an IMS MSC address further comprises storing a table of IMS MSC addresses.

7. The method of claim 6 wherein an mscAddress received in the InitialIN message is compared with the table of IMS MSC addresses.

8. The method of claim 1 wherein establishing IN services and performing VCC anchoring further comprises performing VCC anchoring after establishing IN services.

9. The method of claim 1 wherein establishing IN services with an SCF/SCP further comprises:
   storing parameters received in the first InitialIn message; and
   sending a second InitialIN message to the SCF/SCP if the mscAddress is not in the table of IMS MSC addresses and the eventTypeBCSM indicates a mobile origination wherein the second InitialIN message is comprised of the parameters of the first IntialIN message.

10. The method of claim 1 wherein performing VCC anchoring further comprises:
    sending an InitialIN message to the VCC SCF/SCP;
    receiving an INConnect message from the VCC SCF/SCP;
    storing a temporary routing number received from the VCC SCF/SCP; and
    sending the temporary routing number to the service switching function (SSF)/service switching point (SSP) in an InitialIN message.

11. The method of claim 1 wherein if the mscAddress in not an IMS MSC address, VCC anchoring is performed and IN services are not established via the SCF/SCP.

12. A system comprising:
    computer-readable non-transitory media;
    a service switching function (SSF)/service switching point (SSP);
    a service control function (SCF)/service control point (SCP);
    a voice call continuity (VCC) SCF/SCP;
    a dual mode service (DMS) intelligent networking (IN) Service Provider wherein the DMS IN Service Provider is communicatively coupled to the SSF/SSP, SCF/SCP and VCC SCF/SCP;
    the DMS IN Service Provider configured to establish IN services for a dual mode communication session via the SSF/SSP and SCF/SCP; and
    the DMS IN Service Provider is configured to perform VCC anchoring in an IP Multimedia Subsystem (IMS) network via the VCC SCF/SCP.

13. The system of claim 12 wherein the DMS IN Service Provider is communicatively coupled to the SSF/SSP, SCF/SCP and VCC SCF/SCP with at least one of a/an:
    CAMEL signaling protocol;
    Advanced Intelligent Networking signaling protocol;
    Wireless Intelligent Networking signaling protocol; and
    Intelligent Networking Application Protocol.

14. The system of claim 12 wherein the DMS IN Service Provider configured to establish IN services further comprises a DMS IN Service Provider configured to receive an InitialIN message wherein the InitialIN message is at least one of a:
    CAMEL Application Part IntialDP message;
    Advanced Intelligent Networking Info_Analyzed message;
    Advanced Intelligent Networking Info_Collected message;
    Advanced Intelligent Networking Termination_Attempt message;
    Wireless Intelligent Networking Origination Request Invoke message; and
    Intelligent Networking Application Part InitialDP message.

15. The system of claim 12 wherein the DMS IN Service Provider is configured to maintain a table of MSC addresses comprising MSCs resident in an IMS network.

16. The system of claim 12 wherein establishing IN services for a dual mode communication session further comprises:
    receiving a first InitialIN message from the SSF/SSP and storing the parameters of the first InitialIN message;
    comparing an mscAddress received in the first InitialIN message to the table of IMS MSC addresses;
    determining an event type that is a basic call state model (eventTypeBCSM) received in the first InitialIN message; and establishing DMS IN services via the SCF/SCP and anchoring the DMS communication session in IMS, if the eventTypeBCSM indicates the communication session is a mobile origination and the mscAddress is the address of an MSC not in the table of IMS MSC addresses.

17. The system of claim 16 wherein establishing DMS IN services further comprises:
   sending a second InitialIN message to the SCF/SCP comprised of the parameters of the first IntialIN message;
   receiving a first INConnect message from the SCF/SCP;
   storing a connected number received in the first INConnect message; and
   storing the parameters of the first INConnect message.

18. The system of claim 17 wherein anchoring the DMS communication session in IMS further comprises:
   sending a third InitialIn message to the VCC SCF/SCP wherein the connected number is sent in the third InitialIN message;
   receiving a second INConnect message from the VCC SCF/SCP;
   storing a temporary routing number received from the VCC SCF/SCP; and
   sending a third INConnect message to the SSF/SSP wherein the third INConnect message is comprised of the parameters stored from the first INConnect message and if a temporary routing number is stored, putting the temporary routing number in the third INConnect message.

19. The system of claim 16 wherein the DMS IN services are established before the communication session is anchored in IMS.

20. The system of claim 16 wherein VCC anchoring is not performed if the mscAddress is in the table of IMS MSC addresses.

21. The system of claim 16 wherein if the mscAddress is not in the table of IMS MSC addresses and the eventTypeBCSM indicates a mobile termination VCC anchoring is performed and IN services are not established via the SCF/SCP.

* * * * *